(12) United States Patent
Asai et al.

(10) Patent No.: US 9,827,864 B2
(45) Date of Patent: Nov. 28, 2017

(54) VEHICLE MOUNTING STRUCTURE OF CONTACTLESS POWER RECEPTION DEVICE

(71) Applicant: NISSAN MOTOR CO., LTD., Yokohama-shi, Kanagawa (JP)

(72) Inventors: Akihiro Asai, Kanagawa (JP); Kengo Maikawa, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/024,192

(22) PCT Filed: Sep. 27, 2013

(86) PCT No.: PCT/JP2013/076194
§ 371 (c)(1),
(2) Date: Mar. 23, 2016

(87) PCT Pub. No.: WO2015/045085
PCT Pub. Date: Apr. 2, 2015

(65) Prior Publication Data
US 2016/0236574 A1    Aug. 18, 2016

(51) Int. Cl.
*H01F 38/14* (2006.01)
*B60L 11/18* (2006.01)
(Continued)

(52) U.S. Cl.
CPC ............ *B60L 11/182* (2013.01); *B60K 1/04* (2013.01); *B60L 5/00* (2013.01); *B60L 11/1829* (2013.01); *B60L 11/1833* (2013.01); *B60L 11/1838* (2013.01); *H01F 27/362* (2013.01); *H01F 27/365* (2013.01); *H01F 38/14* (2013.01);
(Continued)

(58) Field of Classification Search
CPC ..... H01F 38/14; H01F 2038/143; B60L 11/18
See application file for complete search history.

(56) References Cited

U.S. PATENT DOCUMENTS

2010/0225271 A1    9/2010   Oyobe et al.
2011/0121778 A1    5/2011   Oyobe et al.
(Continued)

FOREIGN PATENT DOCUMENTS

DE   10 2011 056 807 A1   6/2013
JP          2009-106136 A   5/2009
(Continued)

*Primary Examiner* — Rexford Barnie
*Assistant Examiner* — Terrence Willoughby
(74) *Attorney, Agent, or Firm* — Foley & Lardner LLP

(57) ABSTRACT

A power reception-side coil is mounted on the bottom surface of a vehicle body and contactlessly receives power transmitted from a power feeding-side coil disposed on the ground. The power reception-side coil is of a solenoid type such that an electric wire is wound with the vehicle longitudinal direction as a coil axis. A shield member that is a plate-shaped magnetic shield is disposed between the bottom surface of the vehicle body and the power reception-side coil. The shield member has a forward-inclined surface serving as a first wall part protruding downward of the vehicle, the forward-inclined surface being raised and provided at the vehicle front side in a direction of the coil axis with respect to the power reception-side coil.

4 Claims, 11 Drawing Sheets

(51) Int. Cl.
*B60K 1/04* (2006.01)
*B60L 5/00* (2006.01)
*H02J 17/00* (2006.01)
*H01F 27/36* (2006.01)
*H02J 50/10* (2016.01)

(52) U.S. Cl.
CPC .............. *H02J 17/00* (2013.01); *H02J 50/10* (2016.02); *B60K 2001/0416* (2013.01); *B60L 2230/10* (2013.01); *B60L 2240/36* (2013.01); *B60L 2250/10* (2013.01); *B60L 2270/147* (2013.01); *Y02T 10/7005* (2013.01); *Y02T 10/7088* (2013.01); *Y02T 90/121* (2013.01); *Y02T 90/122* (2013.01); *Y02T 90/125* (2013.01); *Y02T 90/128* (2013.01); *Y02T 90/14* (2013.01); *Y02T 90/163* (2013.01)

(56) References Cited

U.S. PATENT DOCUMENTS

| | | |
|---|---|---|
| 2011/0214926 A1 | 9/2011 | Ichikawa |
| 2012/0032525 A1 | 2/2012 | Oyobe et al. |
| 2012/0242447 A1 | 9/2012 | Ichikawa |
| 2013/0181667 A1* | 7/2013 | Takeshita .............. B60L 11/182 320/108 |
| 2013/0193749 A1 | 8/2013 | Nakamura et al. |
| 2014/0035520 A1* | 2/2014 | Nakayama .............. H02J 17/00 320/108 |
| 2014/0346815 A1 | 11/2014 | Keutz et al. |

FOREIGN PATENT DOCUMENTS

| | | |
|---|---|---|
| JP | 2010-172084 A | 8/2010 |
| JP | 2011-49230 A | 3/2011 |
| JP | 2011-217452 A | 10/2011 |
| JP | 2013-154815 A | 8/2013 |
| JP | 2013-172503 A | 9/2013 |
| JP | 2013-219861 A | 10/2013 |
| WO | WO 2010/041320 A1 | 4/2010 |
| WO | WO 2011/074091 A1 | 6/2011 |

\* cited by examiner

VEHICLE MOUNTING STRUCTURE OF CONTACTLESS POWER RECEPTION DEVICE

TECHNICAL FIELD

The present invention relates to a vehicle mounting structure of a contactless power reception device including a power reception-side coil that contactlessly receives power transmitted from a power feeding-side coil.

BACKGROUND ART

There has heretofore been proposed a contactless charge device for contactlessly charging a battery mounted on an electric-powered vehicle such as an electric vehicle by using a power reception-side coil provided on the vehicle and a power feeding-side coil provided on the ground (see Patent Literature 1 below).

CITATION LIST

Patent Literature

Patent Literature 1: Japanese Patent Application Publication No. 2011-217452

SUMMARY OF INVENTION

Technical Problem

Incidentally, in the power reception-side coil mounted on the vehicle, a magnetic flux generated during power reception passes through a magnetic material member such as iron included in vehicle body members around the coil, and generates eddy currents, which may heat up the magnetic material member.

Therefore, it is an object of the present invention to suppress the eddy currents being generated in the magnetic material member around the power reception-side coil by the magnetic flux generated in the coil.

Solution to Problem

The present invention include a power reception-side coil configured to be mounted on a bottom surface of a vehicle body and to contactlessly receive power transmitted from a power feeding-side coil, the power reception-side coil having a conductive wire wound with a vehicle longitudinal direction as a coil axis; and a plate-shaped magnetic shield configured to be provided around the power reception-side coil on the bottom surface of the vehicle body and to cover the bottom surface of the vehicle body, in which the magnetic shield has a first wall part provided on at least one of a vehicle body front side and a vehicle body rear side in a direction of the coil axis with respect to the power reception-side coil, the first wall part protruding downward of the vehicle.

Advantageous Effects of Invention

According to the present invention, a magnetic flux in the power reception-side coil is directed downward of the vehicle by the first wall part of the magnetic shield. Thus, the distribution range of the magnetic flux in the vehicle longitudinal direction corresponding to the direction of the coil axis can be reduced. Accordingly, eddy currents can be suppressed from being generated by the magnetic flux entering into a magnetic material member such as a vehicle body member around the power reception-side coil.

DESCRIPTION OF EMBODIMENTS

With reference to the drawings, an embodiment of the present invention is described in detail below.

[Overview of Contactless Charger]

Figure 1:
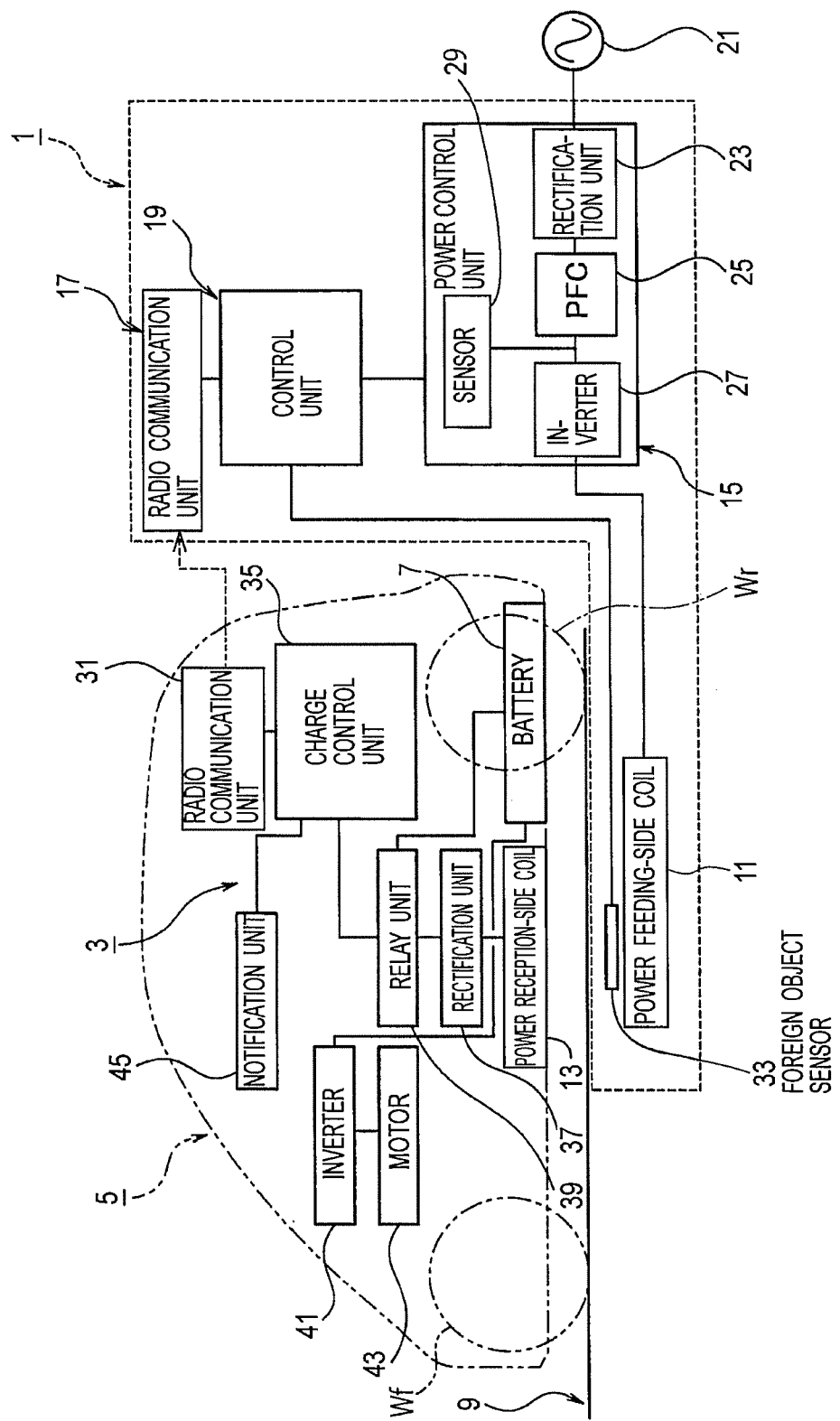
FIG. 1 is an overall configuration diagram schematically showing a contactless charger including a vehicle mounting structure of a contactless power reception device according to an embodiment of the present invention.

A contactless charger according to this embodiment shown in FIG. 1 includes a power feeding device 1 that is a ground-side unit and a power reception device 3 that is a vehicle-side unit. The contactless charger contactlessly supplies power to the power reception device 3 mounted on a vehicle 5 typified by an electric vehicle or a hybrid vehicle from the power feeding device 1 installed at an unillustrated power feeding station or the like, and charges an in-vehicle battery 7. The power feeding device 1 serves as a contactless power feeding device, while the power reception device 3 serves as a contactless power reception device. That is, a vehicle mounting structure of the contactless power reception device according to this embodiment is a structure to mount the power reception device 3 on the vehicle 5. Note that, in FIG. 1, Wf denotes a front wheel and Wr denotes a rear wheel.

The power feeding device 1 includes a power feeding-side coil 11 serving as a power feeding unit disposed in a parking space 9 near a power feeding station. On the other hand, the power reception device 3 includes a power reception-side coil 13 serving as a power reception unit installed at the bottom surface of the vehicle 5 so as to face the power feeding-side coil 11 when the vehicle 5 is parked at a predetermined position in the parking space 9.

The power feeding-side coil 11 and the power reception-side coil 13 both mainly include primary coils made of conductive wires. Electromagnetic induction between the power feeding-side coil 11 and the power reception-side coil 13 enables power to be contactlessly supplied from the power feeding-side coil 11 to the power reception-side coil 13.

The ground-side power feeding device 1 includes a power control unit 15, the power feeding-side coil 11, a radio communication unit 17 and a control unit 19.

The power control unit 15 is a circuit for converting AC power transmitted from an AC source 21 into high-frequency AC power and transmitting the high-frequency AC power to the power feeding-side coil 11, and includes a rectification unit 23, a PFC circuit 25, an inverter 27 and a sensor 29. The rectification unit 23 is a circuit electrically connected to the AC source 21 and configured to rectify output AC power from the AC source 21. The PFC circuit 25 is a circuit (Power Factor Correction) for improving a power factor by shaping an output waveform from the rectification unit 23, and is connected between the rectification unit 23 and the inverter 27.

The radio communication unit 17 performs bidirectional communication with a radio communication unit 31 provided on the vehicle 5 side.

The control unit 19 is a portion that controls the entire power feeding device 1. The control unit 19 transmits a signal to the effect of starting power supply from the power feeding device 1 through the communication between the radio communication units 17 and 31, and receives a signal to the effect of wishing to receive power from the power feeding device 1 from the vehicle 5 side.

In addition, the control unit 19 performs switching control of the inverter 27 based on a detection current of the sensor 29, and controls power transmitted from the power feeding-side coil 11. Moreover, the control unit 19 stops the power feeding based on a detection signal from a foreign object sensor 33 during power feeding, or transmits a warning signal to the vehicle 5 side through the radio communication units 17 and 31.

A metal detection coil, for example, is used as a foreign object sensor 33. The foreign object sensor 33 detects a foreign object when a metal foreign object enters or intervenes in a magnetic field formed between the power feeding-side coil 11 and the power reception-side coil 13 during power feeding. In this event, a detection electric signal of the foreign object sensor 33 makes the control unit 19 immediately issue a warning or stop the power feeding, thereby preventing the occurrence of a problem such as a power feeding failure attributable to the intervention of the metal foreign object in the magnetic field.

The power reception device 3 on the vehicle 5 side includes the battery 7 and power reception-side coil 13 described above and a radio communication unit 31, a charge control unit 35, a rectification unit 37, a relay unit 39, an inverter 41, a motor 43 and a notification unit 45.

When the vehicle 5 is parked at a predetermined stop position in the parking space 9, the power reception-side coil 13 faces the power feeding-side coil 11 immediately thereabove and is positioned keeping a distance from the power feeding-side coil 11.

The rectification unit 37 includes a rectification circuit connected to the power reception-side coil 13 and configured to rectify the AC power received by the reception-side coil 13 to DC power.

The relay unit 39 includes a relay switch that is switched on and off by control by the charge control unit 35. Also, the relay unit 39 separates a main circuit system including the battery 7 from the power reception-side coil 13 and the rectification unit 37, which are included in a circuit unit for charge, by turning off the relay switch.

The battery 7 is configured by connecting secondary cells, and serves as an electric power source for the vehicle 5. The inverter 41 is a control circuit such as a PWM control circuit having a switching element such as an IGBT. The inverter 41 converts DC power outputted from the battery 7 into AC power based on a switching control signal, and supplies the AC power to the motor 43. The motor 43 includes a three-phase AC motor, for example, and serves as a drive source for driving the vehicle 5.

The notification unit 45 includes a warning lamp, a display of a navigation system, a speaker or the like, and outputs light, images, voices or the like to a user based on control by the charge control unit 35.

The charge control unit 35 is a controller for controlling the charge of the battery 7, and controls the radio communication unit 31, the notification unit 45, the relay unit 39 and the like. The charge control unit 35 transmits a signal to the effect of starting the charge to the control unit 19 through communication between the radio communication units 31 and 17. Moreover, the charge control unit 35 is connected to an unillustrated controller for controlling the entire vehicle 5 through a CAN communication network. This controller manages the switching control of the inverter 41 and a charged state (SOC) of the battery 7. Then, when the battery is fully charged based on the charged state of the battery 7 according to the controller, the charge control unit 35 transmits a signal to the effect of terminating the charge to the control unit 19.

In the contactless charge device according to this embodiment, high-frequency power is transmitted and received without any contact by the electromagnetic induction between the power feeding-side coil 11 and the power reception-side coil 13. In other words, when a voltage is applied to the power feeding-side coil 11, the power feeding-side coil 11 and the power reception-side coil 13 are magnetically coupled to each other. Accordingly, power is supplied from the power feeding-side coil 11 to the power reception-side coil 13.

[Overview of Vehicle Mounting Structure of Contactless Power Reception Device]

Next, a vehicle mounting structure of the contactless power reception device in the above contactless charger is described below. Note that, in the figures referred to hereinafter, the direction indicated by the arrow FR denotes the front of the vehicle.

Since respective opposing protective housing walls of the power feeding-side coil 11 and the power reception-side coil 13 described above are in an electromagnetic induction area, the protective housing walls are made of a synthetic resin material so as not to interfere with the electromagnetic induction. The power reception-side coil 13 and the battery 7 in the contactless power reception device are both mounted on the bottom surface of a floor panel 47 shown in FIG. 2 of the vehicle 5, i.e., the bottom surface of the vehicle body.

Figure 2:
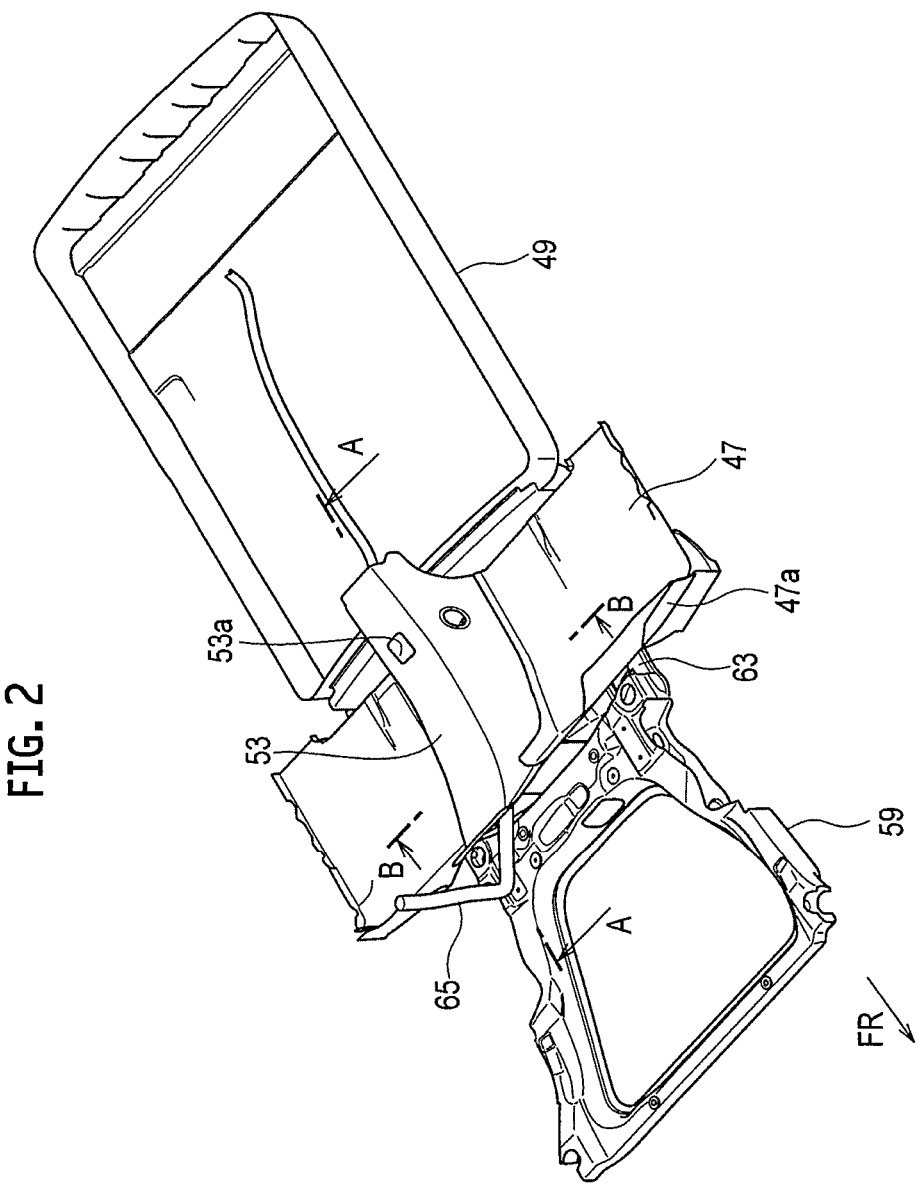
FIG. 2 is a perspective view of a vehicle body lower configuration including the vehicle mounting structure of the contactless power reception device according to the embodiment of the present invention.

Another unillustrated floor panel is connected to the vehicle rear side of the floor panel 47 shown in FIG. 2, and a battery case 49 for housing the battery 7 is disposed below the unillustrated floor panel. Note that the battery case 49 shown in FIG. 2 is a lower case, and an upper opening of the lower case is closed by an unillustrated upper case. The battery case 49 is fastened and fixed from below to vehicle body framework members such as unillustrated side members and cross members.

In the center of the floor panel 47 in the vehicle width direction, a tunnel part 53 is provided, which protrudes upward and extends in the vehicle longitudinal direction. A front end 47*a* of the floor panel 47 is bent upward to form a dash lower. This dash lower is connected to a lower end of an unillustrated dash upper. A dash panel including the dash upper is a partition member that separates a vehicle interior 55 formed above the floor panel 47 and a front compartment 57 formed on the vehicle front side of the vehicle interior 55 in the vehicle longitudinal direction, as shown in FIG. 3.

A motor unit including the inverter 41 and the motor 43 shown in FIG. 1 is housed in the front compartment 57. The motor unit is attached to a sub-frame 59 shown in FIG. 2 by means of an unillustrated mount member. The sub-frame 59 is formed in an approximately rectangular shape in a planar view, and front and rear ends on both sides thereof in the vehicle width direction are connected to lower surfaces of front and rear ends of unillustrated left and right front side members, thereby forming a vehicle body framework member on the lower side of the front compartment 57. The front side members are vehicle body framework members extending in the vehicle longitudinal direction on both sides in the vehicle width direction.

Figure 5:
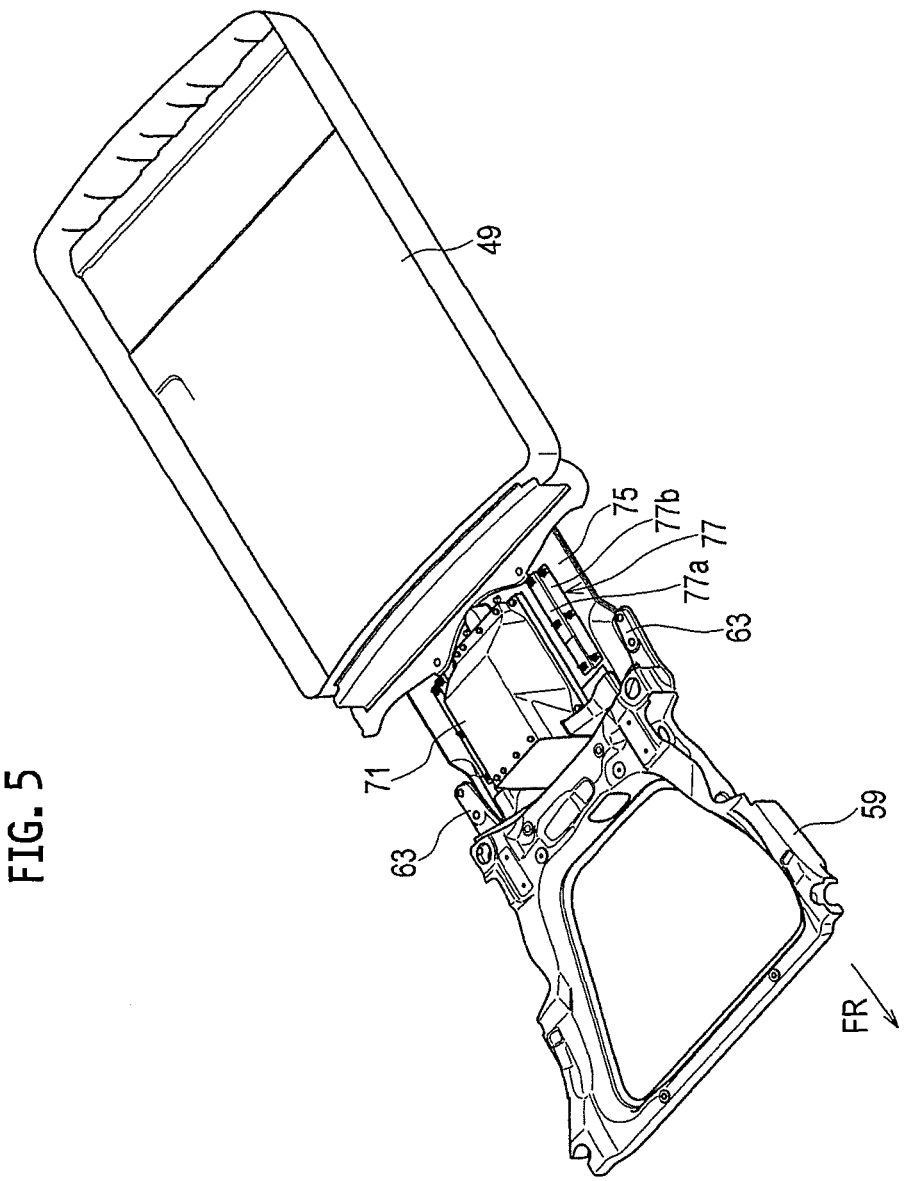
FIG. 5 is a perspective view omitting a floor panel in FIG. 2.
Figure 6:
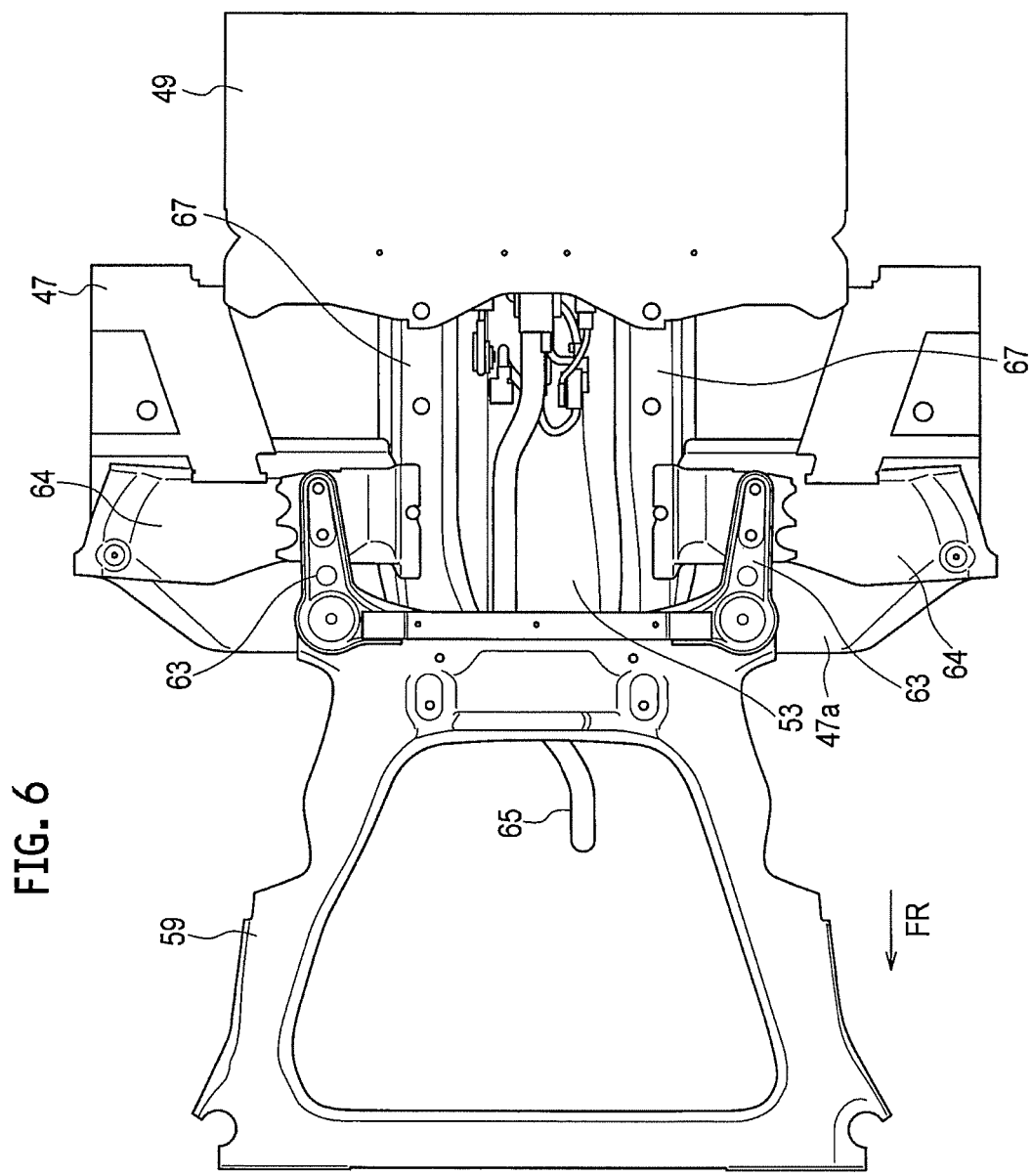
FIG. 6 is a bottom view of the vehicle body, as seen from below, in a state where a shield member, a power reception-side coil and the like are omitted.

On both sides of the rear end of the sub-frame 59 in the vehicle width direction, extension parts 63 are provided, which extend toward the rear of the vehicle along the both sides of the power reception-side coil 13 in the vehicle width direction and stiffen the fixed portions of the power reception-side coil 13 (see FIGS. 5 and 6). The extension parts 63 have their rear ends connected to outriggers 64 shown in FIG. 6. The outriggers 64 are members connecting undermentioned tunnel members 67 (see FIGS. 6 and 8) and unillustrated side sills extending in the vehicle longitudinal direction on both sides in the vehicle width direction. The extension parts 63 may be formed integrally with or separately from the sub-frame 59.

Figure 3:
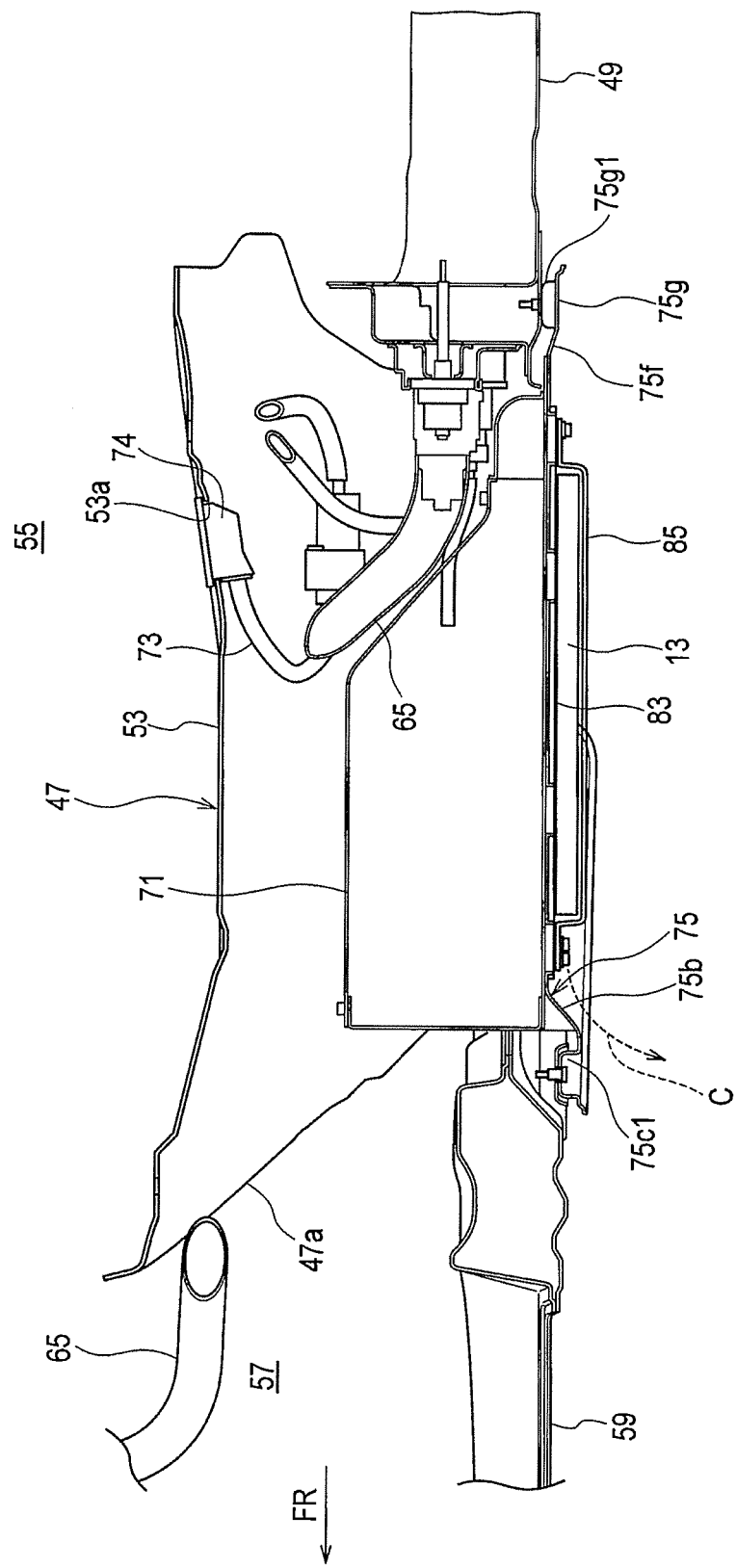
FIG. 3 is a cross-sectional view taken along the line A-A in FIG. 2.

Here, as shown in FIG. 3, a mounting layout of the battery 7 (battery case 49), the power reception-side coil 13 and the motor unit housed in the front compartment 57 on the vehicle 5 is linear in the vehicle longitudinal direction. Also, a wire harness 65 for power system that transmits power from the battery 7 to the motor unit is routed along the inside of the tunnel part 53 with each end of the wire harness 65 connected to the front end of the battery 7 and the rear end of the motor unit (rear end of the inverter 41) through connectors.

Figure 8:
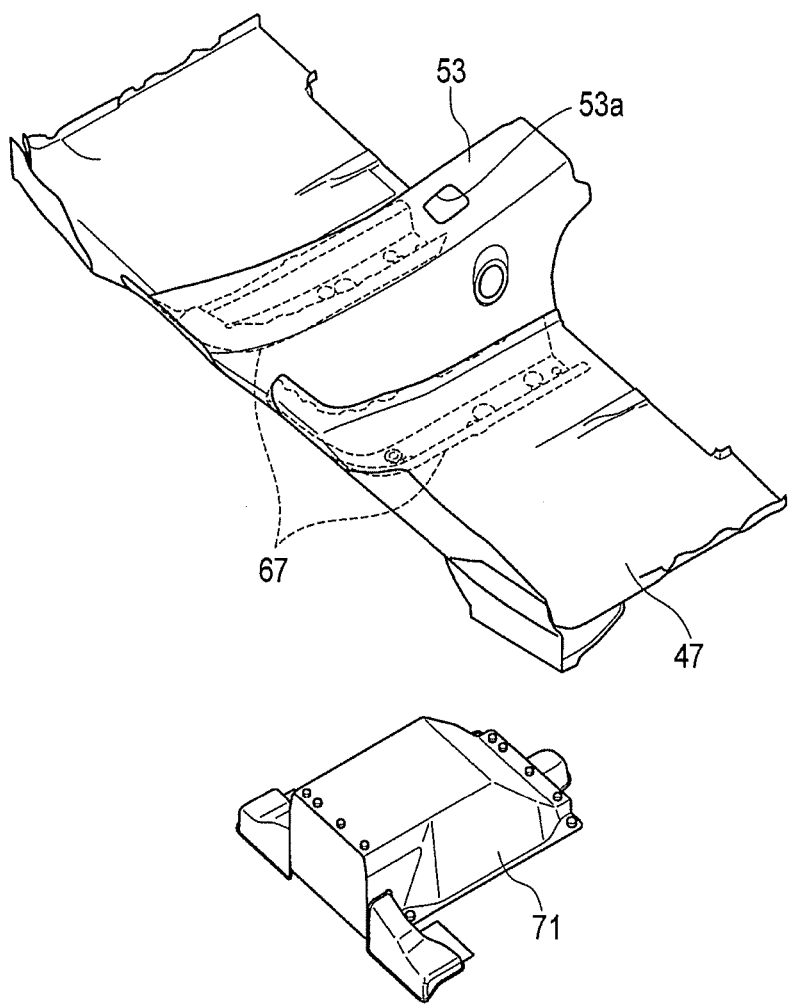
FIG. 8 is an exploded perspective view showing the floor panel shown in FIG. 2 and some of various parts on the floor panel side, which are attached to the lower surface of the floor panel.

The tunnel members 67 to be stiffeners are joined and fixed to lower surfaces of both edges of the tunnel part 53 in the vehicle width direction (base portions of the mountain-shaped tunnel part 53) (see FIGS. 6 and 8). The rigidity of the floor panel 47 is ensured by floor framework members such as the tunnel members 67, the side sills extending in the vehicle longitudinal direction on both sides in the vehicle width direction, unillustrated cross members extending along the vehicle width direction, and the outriggers 64 connecting the tunnel members 67 to the side sills adjacent thereto on the front part of the floor.

Figure 4:
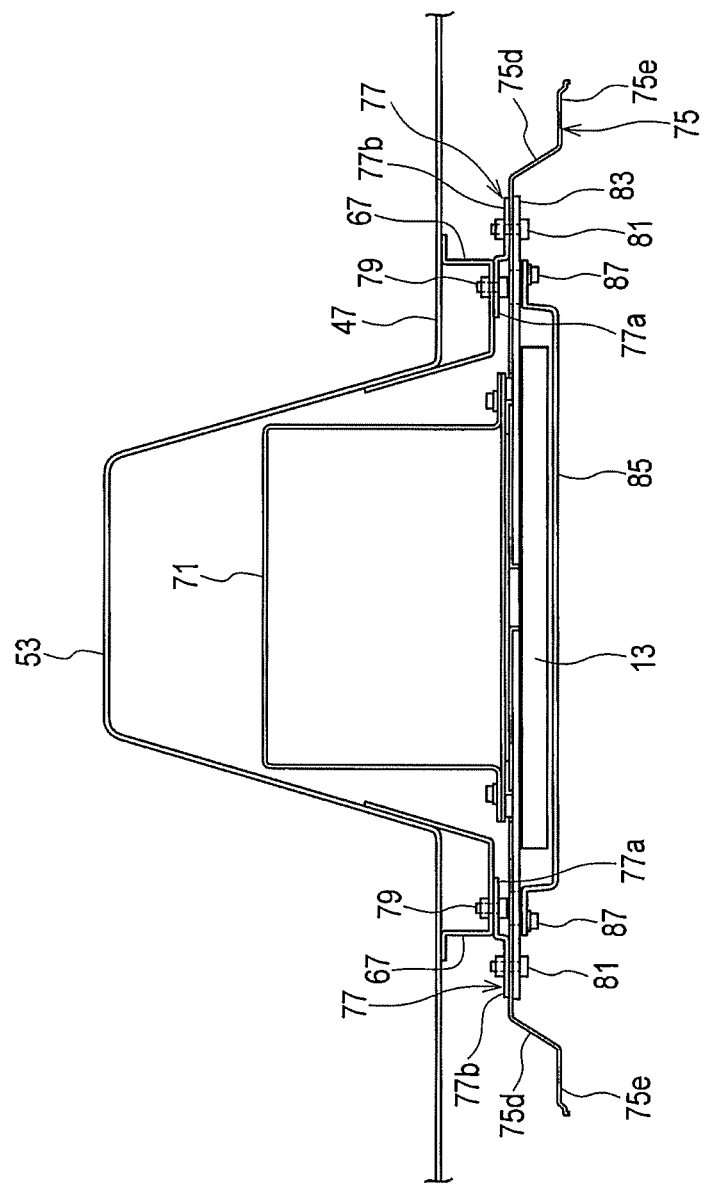
FIG. 4 is a cross-sectional view taken along the line B-B in FIG. 2.

Therefore, the large and heavy battery 7 is firmly fastened and fixed to the main framework members such as the side sills and the cross members described above and the tunnel members 67 of the tunnel part 53. As shown in FIGS. 4 and 8, each of the tunnel members 67 has a hat-shaped cross section with an opening in its upper part, and is joined and fixed to the bottom surface of the floor panel 47 at the base of the tunnel part 53 to form a closed cross-section with the floor panel 47.

As shown in FIG. 3, the power reception-side coil 13 and a junction box 71 positioned on the power reception-side coil 13 are disposed below the tunnel part 53 in which the wire harness 65 is routed. The junction box 71 houses the charge control unit 35, the rectification unit 37, the relay unit 39 and the like described with reference to FIG. 1.

On the top wall of the tunnel part 53, a through-hole 53*a* is provided in a position close to the junction box 71, through which a wire harness 73 for power system is routed. The wire harness 73 transmits power from the battery 7 or the junction box 71 to an unillustrated interior auxiliary machine such as an air-conditioning unit mounted in the vehicle interior 55. The through-hole 53*a* is fitted with a grommet 74 to seal the portion around the harness disposed therethrough.

Figure 7:
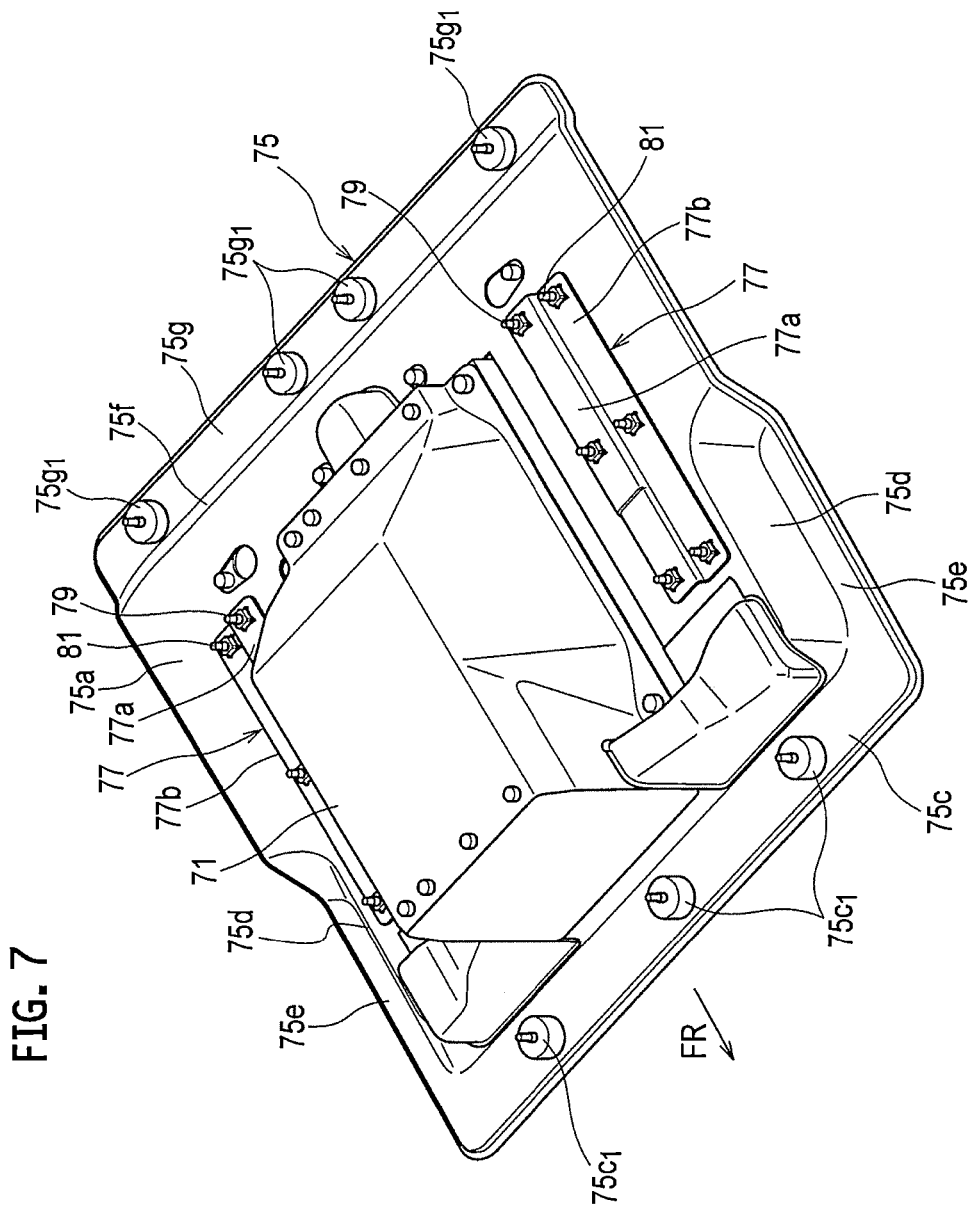
FIG. 7 is a perspective view including a shield member shown in FIG. 5.

As shown in FIGS. 5 and 7, the junction box 71 is attached on a shield member 75 serving as a magnetic shield. The junction box 71 has a width in the vehicle width direction sufficiently smaller than that of the shield member 75 in the same direction, and is positioned inside the tunnel part 53 in a state of being surrounded by the inner wall of the tunnel part 53.

The shield member 75 is a plate-shaped member made of aluminum, which is attached to the bottom surfaces of the tunnel members 67 by means of a pair of left and right attachment brackets 77 shown in FIGS. 4, 5, 7 and 9 so as to close the opening below the tunnel part 53. Thus, the junction box 71 is housed in a space surrounded by the shield member 75 and the tunnel part 53.

Each of the attachment brackets 77 has a tunnel-side attachment part 77*a* positioned on the inside in the vehicle width direction and a shield member-side attachment part 77*b* bent downward with respect to the tunnel-side attachment part 77*a* and positioned on the outside in the vehicle width direction. The tunnel-side attachment parts 77*a* are fastened and fixed to the lower surfaces of the tunnel members 67 with bolts 79, and the shield member-side attachment parts 77*b* are fastened and fixed to the upper surface of the shield member 75 with bolts 81.

Figure 9:
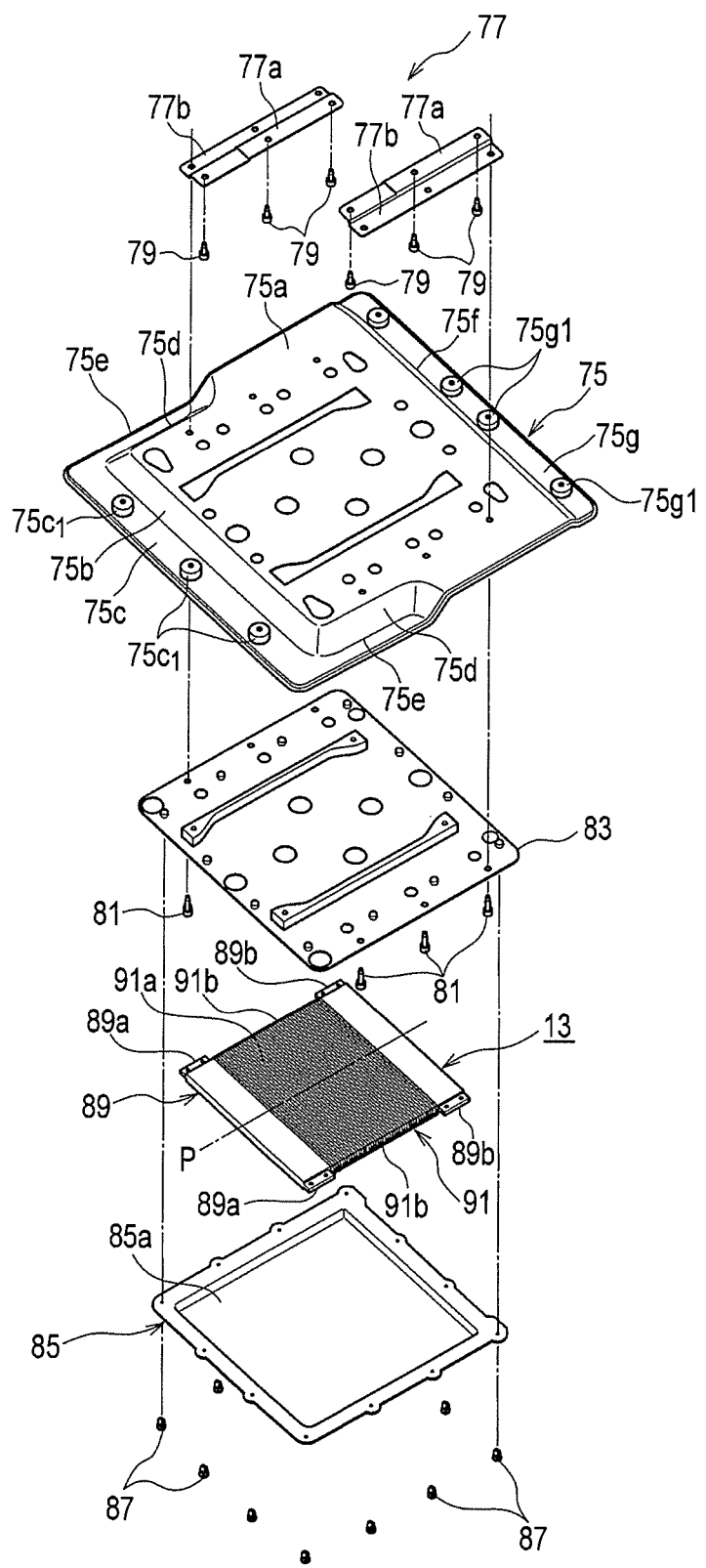
FIG. 9 is an exploded perspective view showing the floor panel shown in FIG. 2 and some of the various parts on the shield member side, which are attached to the lower surface of the floor panel.

For fastening the shield member 75 with the bolts 81, a coil base 83 shown in FIG. 9 is disposed below the shield member 75. More specifically, the coil base 83 and the shield member 75 are fastened together to the tunnel members 67 with the bolts 81. The power reception-side coil 13 is attached to and held by the lower surface of the coil base 83. The coil base 83 is a plate-shaped member made of aluminum having a thickness larger than that of the shield member 75, and ensures attachment strength to the tunnel members 67.

Then, a coil cover 85 is fastened and fixed from below, with bolts 87, to the coil base 83 having the power reception-side coil 13 attached to its bottom surface. The coil cover 85 includes a recess 85*a* that is concave with respect to its outer peripheral portion to receive the power reception-side coil 13 therein. At a position corresponding to the recess 85*a*, the power reception-side coil 13 is housed between the coil base 83 and the coil cover 85. Therefore, the power reception-side coil 13 is attached to the bottom surface of the vehicle body through the coil base 83.

Since the coil cover 85 forms a protective housing wall facing both of the power feeding-side coil 11 and the power reception-side coil 13 described above, it is made of synthetic resin so as not to interfere with the electromagnetic induction between the power feeding-side coil 11 and the power reception-side coil 13.

Figure 10:
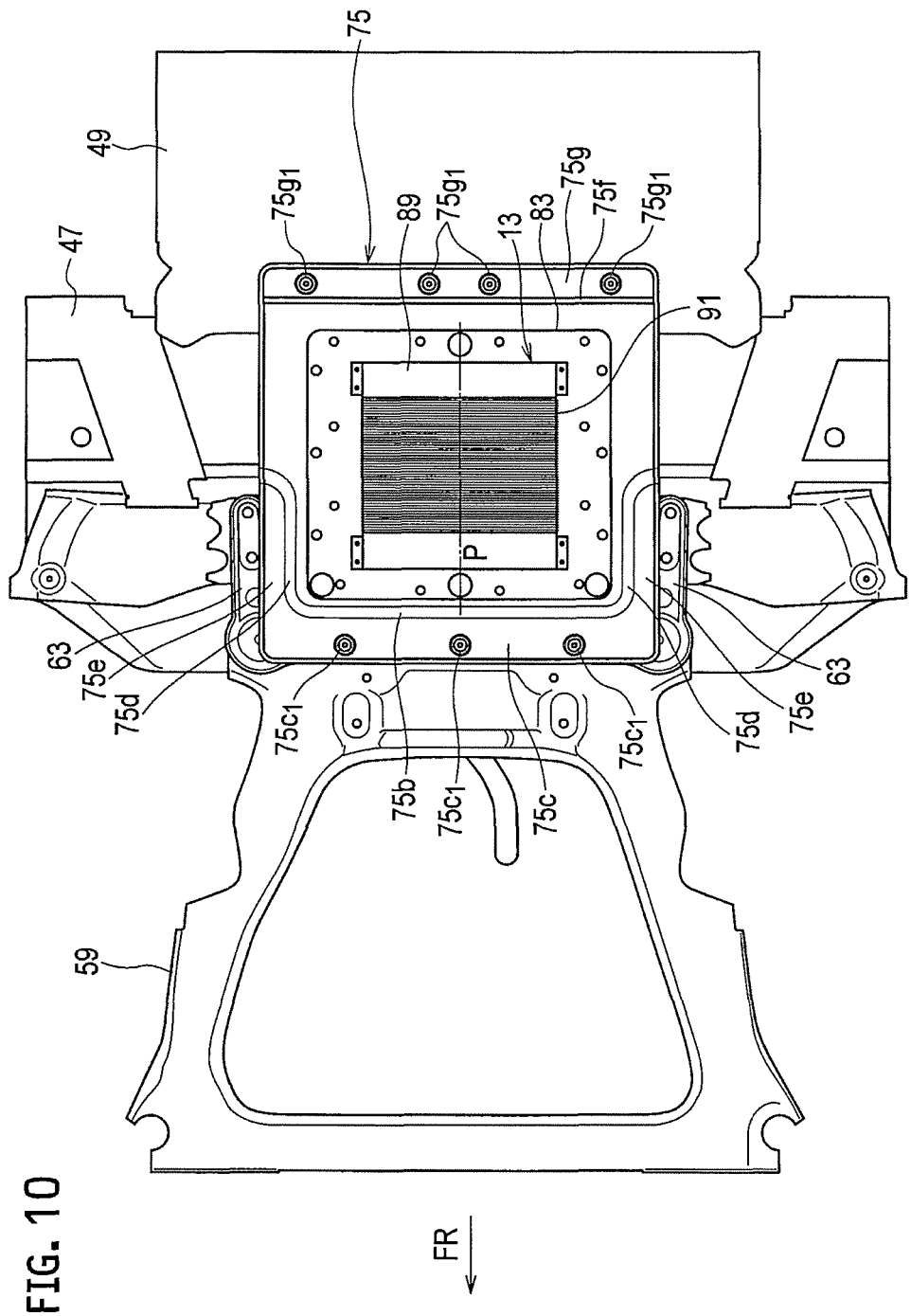
FIG. 10 is a bottom view of the vehicle body, as seen from below, in a state where a coil cover is omitted.

The power reception-side coil 13 is a solenoid type coil, including a plate-shaped iron core 89 and an electric wire 91 serving as a conductive wire wound around the iron core 89, and having a coil axis P extending in the vehicle longitudinal direction, as shown in FIGS. 9 and 10. FIG. 10 is a view of the vehicle body, as seen from below, in a state where the coil cover 85 is omitted. The coil axis P of the power reception-side coil 13, i.e., the central axis of the looped portion of the electric wire 91 wound in a loop pattern corresponds to the vehicle longitudinal direction. The electric wire 91 is wound on the iron core 89 around the coil axis P as the center so as to draw a circle (including an oval or ellipse elongated in the vehicle width direction) or to form a loop as seen from the vehicle longitudinal direction.

The coil axis P corresponds to the vehicle longitudinal direction and is approximately parallel to the vehicle longitudinal direction. Thus, the electric wire 91 wound around the iron core 89 has portions 91a extending along the vehicle width direction and portions 91b extending along the vehicle vertical direction. The portions 91a extending along the vehicle width direction are positioned on both the top and bottom sides of the iron core 89, while the portions 91b extending in the vehicle vertical direction are positioned on both sides thereof in the vehicle width direction.

The iron core 89 is made of a plate-shaped magnetic material, and both ends thereof in the vehicle longitudinal direction include attachment parts 89a and 89b protruding outward in the vehicle width direction. The both ends in the vehicle longitudinal direction including the attachment parts 89a and 89b serve as magnetic poles. The electric wire 91 is wound between the attachment parts 89a and 89b of the iron core 89, which are positioned along the vehicle longitudinal direction, i.e., between the magnetic poles along the vehicle longitudinal direction. The power reception-side coil 13 is attached to the coil base 83 by means of the attachment parts 89a and 89b.

Figure 11:
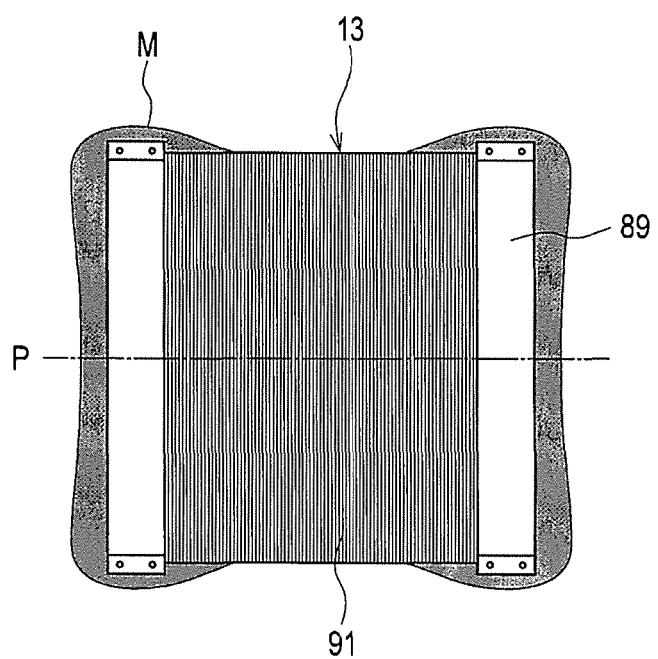
FIG. 11 is a diagram showing a magnetic flux distribution of the power reception-side coil.

In the solenoid type power reception-side coil 13 as described above, as shown in FIG. 11, an amount of magnetic field lines is increased and a magnetic flux M is also increased (becomes larger) around both sides of the coil in the direction of extending the coil axis P (both left and right ends in FIGS. 10 and 11), i.e., around the magnetic poles at both ends of the coil in the vehicle longitudinal direction. A magnetic flux generated in the power reception-side coil 13 is increased around the magnetic poles at both ends in the vehicle longitudinal direction as described above, and is directed not only to the vehicle longitudinal direction but also to the surroundings including the vehicle width direction and the vehicle vertical direction from the magnetic poles.

For the power reception-side coil 13 as described above, the shield member 75 includes a magnetic shield function to shield the magnetic flux generated in the power reception-side coil 13. That is, the shield member 75 is a plate-shaped magnetic shield covering the bottom surface of the vehicle body around the power reception-side coil 13 on the bottom surface of the vehicle body. In the shield member 75, mainly three sides of its periphery on the vehicle front side are bent downward with respect to the bracket attachment surface 75a to which the shield member-side attachment parts 77b of the attachment brackets 77 are attached, as shown in FIG. 9.

More specifically, the shield member 75 has a front inclined surface 75b bent downward on the vehicle front side thereof. The front inclined surface 75b serves as a first wall part which protrudes downward of the vehicle and is provided on at least one of the vehicle front side and the vehicle rear side in the coil axis P direction with respect to the power reception-side coil 13.

The front inclined surface 75b has a surface intersecting the coil axis P, and is inclined such that its lower end is positioned more forward in the vehicle front direction than its upper end, as shown in FIG. 3. The inclination angle thereof is about 45 degrees with respect to the horizontal surface. On the vehicle front side of the front inclined surface 75b, an attachment surface 75c is formed extending toward the front of the vehicle. The attachment surface 75c is connected to the lower surface of the rear end of the sub-frame 59 with bolts through circular protrusions 75c1 protruding upward.

Moreover, the shield member 75 has side inclined surfaces 75d as second wall parts on both sides in the vehicle width direction in approximately half of the region on the vehicle front side. The side inclined surfaces 75d serve as the second wall parts extending in parallel with the direction of the coil axis P of the power reception-side coil 13 from the ends of the first wall part in the vehicle width direction.

The side inclined surfaces 75d are inclined such that the lower ends are positioned on the outer side in the vehicle width direction than the upper ends, and the inclination angle thereof is about 45 degrees with respect to the horizontal surface as in the case of the front inclined surface 75b. On the outside of the side inclined surfaces 75d in the vehicle width direction, horizontal surfaces 75e are formed extending outward in the vehicle width direction. The horizontal surfaces 75e are positioned on the same plane continuous with the attachment surface 75c on the vehicle front side.

Furthermore, the shield member 75 has a rear inclined surface 75f on the rear side of the vehicle. The rear inclined surface 75f forms the first wall part together with the front inclined surface 75b. More specifically, the first wall part has the front inclined surface 75b that is a front-side wall part on the vehicle front side of the power reception-side coil 13 and the rear inclined surface 75f that is a rear-side wall part on the vehicle rear side of the power reception-side coil 13.

The rear inclined surface 75f described above is inclined such that its lower end is positioned more backward in the vehicle rear direction than its upper end, and the inclination angle thereof is about 45 degrees with respect to the horizontal surface. However, a length (height) in the inclination direction between the lower end and the upper end of the rear inclined surface 75f is shorter (lower) than a length (height) in the inclination direction of the front inclined surface 75b or the side inclined surfaces 75d.

On the vehicle rear side of the rear inclined surface 75f, an attachment surface 75g is formed extending backward of the vehicle. As shown in FIGS. 3 and 10, the attachment surface 75g is connected with bolts to the lower surface of the battery case 49 through circular protrusions 75g1 protruding upward. Since the vertical height of the rear inclined surface 75f is lower than the front inclined surface 75b, the attachment surface 75g is positioned above the attachment surface 75c on the vehicle front side.

[Advantageous Effects of Vehicle Mounting Structure of Contactless Power Reception Device]

In the vehicle mounting structure of the contactless power reception device thus configured, the power reception-side coil 13 contactlessly receives high-frequency power by the electromagnetic induction between the power reception-side coil 13 and the power feeding-side coil 11. In this event, the magnetic flux generated in the power reception-side coil 13 is increased (becomes larger) at the both ends in the coil axis P direction, as described with reference to FIG. 11.

Here, in this embodiment, the shield member 75 that functions as the magnetic shield is not simply formed into a flat plate shape, but includes the front inclined surface 75*b* being raised in the vertical direction and provided on the vehicle front side. Therefore, a large amount of magnetic fluxes directed in the vehicle longitudinal direction approximately parallel to the coil axis P are directed downward of the vehicle such that the magnetic fluxes are magnetically shielded and guided by the front inclined surface 75*b* as indicated by the arrow C in FIG. 3.

Thus, a magnetic flux loop is prevented from being increased (elongated) toward the vehicle front side corresponding to the coil axis P direction. Thus, the magnetic flux distribution range toward the front of the vehicle can be narrowed. As a result, eddy currents can be suppressed from being generated by the magnetic flux affecting a magnetic material member included in the vehicle body members such as the sub-frame 59 positioned on the vehicle front side of the power reception-side coil 13. Thus, heating of the vehicle body members can be suppressed. Moreover, narrowing of the magnetic flux distribution range enables the length of the shield member 75 in the vehicle longitudinal direction to be reduced, thus contributing to reduction in weight of the vehicle body.

Moreover, magnetic flux leakage is reduced by guiding downward the magnetic flux directed toward the front of the vehicle. Thus, a coupling coefficient between the power reception-side coil 13 and the power feeding-side coil 11 can be increased to allow for a highly efficient charge operation. Furthermore, the front inclined surface 75*b* included in the shield member 75 also enables the power reception-side coil 13 to be protected from chipping by small stones or the like.

Moreover, in this embodiment, the shield member 75 that functions as the magnetic shield includes the side inclined surfaces 75*d* being raised in the vertical direction and provided on the both sides in the vehicle width direction. Therefore, components of magnetic fluxes directed to the sides of the vehicle, which are increased around the magnetic poles, are directed downward of the vehicle such that the components are magnetically shielded and guided by the side inclined surfaces 75*d*.

Therefore, eddy currents can be suppressed from being generated by the magnetic flux affecting the magnetic material member included in the vehicle body members such as the extension parts 63 and the outriggers 64 positioned on the sides of the power reception-side coil 13 in the vehicle width direction. Thus, heating of the vehicle body members can be suppressed. Moreover, as in the case of the front inclined surface 75*b*, the side inclined surfaces 75*d* can reduce the magnetic flux leakage and thus increase the coupling coefficient between the power reception-side coil 13 and the power feeding-side coil 11, and the power reception-side coil 13 can also be protected from chipping by small stones or the like.

Furthermore, in this embodiment, the shield member 75 that functions as the magnetic shield includes the rear inclined surface 75*f* provided being raised in the vertical direction and provided on the rear side of the vehicle. Therefore, a large amount of magnetic fluxes directed in the vehicle longitudinal direction are directed downward of the vehicle such that the magnetic fluxes are magnetically shielded and guided by the rear inclined surface 75*f*.

Thus, a magnetic flux loop is prevented from being elongated and increased toward the rear side of the vehicle corresponding to the coil axis P direction. Thus, the magnetic flux distribution range toward the rear of the vehicle can be narrowed. As a result, eddy currents can be suppressed from being generated by the magnetic flux affecting the magnetic material member such as the battery case 49, for example, positioned on the vehicle rear side of the power reception-side coil 13. Thus, heating of the battery case 49 and the like can be suppressed.

Moreover, as in the case of the front inclined surface 75*b* and the side inclined surfaces 75*d*, the rear inclined surface 75*f* can reduce the magnetic flux leakage and thus increase the coupling coefficient between the power reception-side coil 13 and the power feeding-side coil 11, and the power reception-side coil 13 can also be protected from chipping by small stones or the like.

As described above, in this embodiment, the first wall part includes the front inclined surface 75*b* that is the front-side wall part on the vehicle front side of the power reception-side coil 13 and the rear inclined surface 75*f* that is the rear-side wall part on the vehicle rear side of the power reception-side coil 13. Thus, the eddy currents can be suppressed from being generated in the magnetic material member such as the vehicle body member by guiding downward not only the magnetic flux directed to the front of the vehicle approximately parallel to the coil axis P but also the magnetic flux directed to the rear of the vehicle approximately parallel to the coil axis P.

Here, when the power reception-side coil 13 is disposed to the vehicle front side of the vehicle center in the vehicle longitudinal direction, the magnetic flux spreading toward the rear of the vehicle is less likely to leak to the area outside of the vehicle, but the magnetic flux spreading toward the front of the vehicle is more likely to leak to the area outside of the vehicle.

Therefore, in this embodiment, the lower end of the front inclined surface 75*b* is positioned below the lower end of the rear inclined surface 75*f* in a state where the power reception-side coil 13 is disposed to the vehicle front side of the vehicle center in the vehicle longitudinal direction. That is, the vertical length of the front inclined surface 75*b* is longer than the vertical length of the rear inclined surface 75*f*. Thus, the front inclined surface 75*b* can more surely suppress the magnetic flux directed to the front of the vehicle from leaking to the area outside of the vehicle. Moreover, since the downward protruding amount of the lower end of the rear inclined surface 75*f* can be reduced, the flow straightening property under the vehicle floor is improved.

On the other hand, when the power reception-side coil 13 is disposed to the vehicle rear side of the vehicle center in the vehicle longitudinal direction, the magnetic flux spreading toward the front of the vehicle is less likely to leak to the area outside of the vehicle, but the magnetic flux spreading toward the rear of the vehicle is more likely to leak to the area outside of the vehicle In this case, the lower end of the rear inclined surface 75*f* is positioned below the lower end of the front inclined surface 75*b* in a state where the power reception-side coil 13 is disposed to the vehicle rear side of the vehicle center in the vehicle longitudinal direction. That is, the vertical length of the rear inclined surface 75*f* is longer than the vertical length of the front inclined surface 75*b*. Thus, the rear inclined surface 75*f* can more surely suppress the magnetic flux directed to the rear of the vehicle from leaking to the area outside of the vehicle.

Although the embodiments of the present invention have been described above, these embodiments are merely examples described to facilitate the understanding of the present invention and the present invention is not limited to the embodiments. The technical scope of the present invention is not limited to specific technical matters disclosed in the embodiments described above, and includes various modifications, changes, alternative techniques, and the like which can be easily derived therefrom.

Although the shield member 75 is the plate-shaped member made of aluminum in the embodiment described above, for example, a thin aluminum film may be formed by aluminum deposition on the surface of a plate-shaped resin member. Moreover, the side inclined surfaces 75d on the sides of the shield member 75 in the vehicle width direction are formed in approximately half of the region on the vehicle front side. However, the side inclined surfaces 75d may be provided in almost the entire region in the vehicle longitudinal direction including the side thereof on the vehicle rear side. Such a configuration is more advantageous for as a measure against eddy currents, magnetic flux leakage and chipping.

INDUSTRIAL APPLICABILITY

The present invention is applied to a vehicle mounting structure of a contactless power reception device including a power reception-side coil that contactlessly receives power transmitted from a power feeding-side coil.

The invention claimed is:

1. A vehicle mounting structure of a contactless power reception device, comprising:
   a power reception-side coil configured to be mounted on a bottom surface of a vehicle body and to contactlessly receive power transmitted from a power feeding-side coil, the power reception-side coil having a conductive wire wound with a vehicle longitudinal direction as a coil axis; and
   a plate-shaped magnetic shield configured to be provided around the power reception-side coil on the bottom surface of the vehicle body and to cover the bottom surface of the vehicle body,
   wherein the magnetic shield has a first wall part provided on at least one of a vehicle body front side and a vehicle body rear side in a direction of the coil axis with respect to the power reception-side coil, the first wall part protruding downward of the vehicle,
   wherein the first wall part is inclined such that a lower end of the first wall part is positioned more away from the power reception-side coil than an upper end of the first wall part, and is configured to guide a magnetic flux generated in the power reception-side coil downward of the vehicle, and
   wherein the magnetic shield has a second wall part provided therein, the second wall part extending in parallel with the direction of the coil axis of the power reception-side coil from an end of the first wall part in the vehicle width direction and protruding downward of the vehicle.

2. The vehicle mounting structure of a contactless power reception device according to claim 1, wherein
   the first wall part has a front-side wall part on the vehicle front side of the power reception-side coil and a rear-side wall part on the vehicle rear side of the power reception-side coil.

3. The vehicle mounting structure of a contactless power reception device according to claim 2, wherein
   the power reception-side coil is disposed to the vehicle front side of a vehicle center in the vehicle longitudinal direction, and
   a lower end of the front-side wall part is positioned below a lower end of the rear-side wall part.

4. The vehicle mounting structure of a contactless power reception device according to claim 2, wherein
   the power reception-side coil is disposed to the vehicle rear side of a vehicle center in the vehicle longitudinal direction, and
   a lower end of the rear-side wall part is positioned below a lower end of the front-side wall part.

\* \* \* \* \*